(12) United States Patent
Panetta et al.

(10) Patent No.: US 7,434,363 B2
(45) Date of Patent: *Oct. 14, 2008

(54) INSULATING COVER

(75) Inventors: Paul Panetta, Lincoln, MA (US); Dave Peterson, Acton, MA (US); Jordan Beaumont, Newton, MA (US)

(73) Assignee: Atticap Corporation, Lincoln, MA (US)

( * ) Notice: Subject to any disclaimer, the term of this patent is extended or adjusted under 35 U.S.C. 154(b) by 55 days.

This patent is subject to a terminal disclaimer.

(21) Appl. No.: 11/230,701

(22) Filed: Sep. 20, 2005

(65) Prior Publication Data

US 2006/0010806 A1    Jan. 19, 2006

Related U.S. Application Data

(63) Continuation of application No. 10/165,889, filed on Jun. 10, 2002, now Pat. No. 6,966,153.

(60) Provisional application No. 60/298,352, filed on Jun. 16, 2001.

(51) Int. Cl.
E04B 1/74 (2006.01)
(52) U.S. Cl. .............................. 52/404.1; 52/202; 52/19
(58) Field of Classification Search ................ 52/404.1, 52/202, 19; D3/304, 310
See application file for complete search history.

(56) References Cited

U.S. PATENT DOCUMENTS

| | | | | |
|---|---|---|---|---|
| 2,321,499 A | * | 6/1943 | Marschke | 182/81 |
| 2,614,407 A | * | 10/1952 | Mercer | 211/74 |
| 3,799,386 A | * | 3/1974 | Madalin et al. | 206/564 |
| 4,151,894 A | * | 5/1979 | Edwards | 182/77 |
| 4,281,743 A | | 8/1981 | Fuller | |
| 4,299,059 A | | 11/1981 | Smith | |
| 4,344,505 A | * | 8/1982 | Waters et al. | 182/47 |
| 4,541,208 A | * | 9/1985 | Vesperman et al. | 52/19 |
| 4,550,534 A | | 11/1985 | Mariano et al. | |
| 4,563,845 A | | 1/1986 | Stipe | |
| 4,928,441 A | | 5/1990 | Daley | |
| 5,274,966 A | | 1/1994 | Daley | |
| 5,378,078 A | | 1/1995 | Lewis et al. | |
| D358,710 S | * | 5/1995 | Meyers et al. | D3/310 |
| 5,481,833 A | | 1/1996 | Williams | |
| 5,628,151 A | | 5/1997 | Monat | |
| D381,203 S | * | 7/1997 | Ackermann et al. | D3/307 |
| 5,867,946 A | | 2/1999 | Seagren | |
| 5,953,866 A | | 9/1999 | Poole | |
| 6,014,841 A | * | 1/2000 | McCoy et al. | 52/19 |
| 6,036,049 A | * | 3/2000 | Hwang | 220/826 |
| RE36,975 E | | 12/2000 | Williams | |

(Continued)

OTHER PUBLICATIONS

First page of website; "www.thermalid.com".

(Continued)

*Primary Examiner*—Basil Katcheves
(74) *Attorney, Agent, or Firm*—Daly, Crowley, Mofford & Durkee, LLP

(57) ABSTRACT

A thermal insulating cover is presented. The cover includes a top, a plurality of sides extending from the top and a wide base perimeter extending from the plurality of sides. The device may be formed as a unitary piece, or may be provided in two or more sections which are easily assembled together. A piece of foam, acting as a gasket may be affixed to the base perimeter.

11 Claims, 4 Drawing Sheets

U.S. PATENT DOCUMENTS

| | | | | |
|---|---|---|---|---|
| D448,567 S | * | 10/2001 | Buss | D3/310 |
| 6,601,352 B1 | | 8/2003 | Obermeyer et al. | |
| 6,619,500 B1 | * | 9/2003 | Lantz | 220/592.1 |
| D495,139 S | * | 8/2004 | Sullivan | D3/310 |
| 6,966,153 B2 | * | 11/2005 | Panetta et al. | 52/19 |

OTHER PUBLICATIONS

First page of website; "www.insulsure.com".

First page of website; "www.draftcap.com".

* cited by examiner

INSULATING COVER

CROSS-REFERENCE TO RELATED APPLICATIONS

This application is a Continuation Application of and claims the benefit under 35 U.S.C. §120 of U.S. application Ser. No. 10/165,889 filed on Jun. 10, 2002, now U.S. Pat. No. 6,966,153 which application claims the benefit under 35 U.S.C. § 119(e) of U.S. Provisional Application No. 60/298,352 filed on Jun. 16, 2001. The above-identified applications are incorporated herein by reference in their entirety.

BACKGROUND OF THE INVENTION

Typically a set of folding stairs is provided in the ceiling to allow walk-up access to the attic. A problem associated with this arrangement is the lack of insulation provided between the attic and the room below when the stairs are in their folded position. Typically, this opening is left uninsulated since the folding stairs occupy the space where insulation would normally reside. This results in a loss of heat and/or cooling from the room below the attic opening into the attic.

Devices have been developed which attempt to cover the pull-down stairs in an attic, however these devices have limitations which affect their use. One such device is shown in U.S. Pat. No 4,281,743 to Fuller (hereinafter Fuller). The device of Fuller comprises multiple pieces having overlapping tongue-and-groove sections. The Fuller device thus requires assembly of its interlocked structure. The use of multiple pieces can reduce the overall thermal efficiency, as well as affect the strength and rigidity of the cover. The Fuller device may also come apart, and may requires use of a binding strap to keep the unit whole, as discussed on column 7, lines 17-28.

Another attempt to solve the problem of thermal loss through an attic access way is shown in U.S. Pat. No. 4,299,059 to Smith (hereinafter Smith). Smith discloses an insulated, fire resistant attic door. In Smith, the pull-down door that supports at least a part of the folding stairway includes a layer of insulative material. The Smith device cannot be used in previously installed pull-down stairways, and would thus be labor intensive to install as well as incur significant cost to retrofit existing pull-down stairways.

U.S. Pat. No. 4,550,534 to Mariano et al. (hereinafter Mariano) is another attempt to solve the problem of thermal loss through an attic access way. The device of Mariano includes a hinged cover, a latching mechanism and a leaf spring. The Mariano device thus requires mechanical installation, and has several moving parts which can wear out or otherwise fail.

U.S. Pat. No. 4,563,845 to Stipe (hereinafter Stipe) comprises a cover which is attached to the ceiling side of the door of the pull-down stairway. The Stipe device thus extends into the room having the attic opening, providing an extended portion of the ceiling, and making the presence of the attic access way much more noticeable.

Devices available from Atticcap (www.atticcap.com) and from Thermalid (www.thermalid.com) are only useful in attics having a finished floor. These devices have narrow base structures which rely on the attic having a finished floor in order to provide the thermal barrier. For attics having unfinished floors, these devices do not provide a continuous thermal barrier.

Additional devices such as the Attic Tent available from Insulsure (www.insulsure.com) comprise a tent-like structure. A base portion is mechanically attached to the attic floor, and a hood is attached to the base portion by a zipper. This makes the device difficult to close and open since the hood portion must be unzippered to access the attic and then zippered to close the attic opening. Zippers can jam and break, rendering the attic space unusable. There may additionally be thermal loss through the zipper structure.

Birdzone (www.birdzone.com) produces a folding attic stair insulator comprising a backbone of PVC piping to with fabric is attached to provide the cover. The Birdzone device requires assembly and installation. Since the device is not rigid in structure, the fabric could easily become damaged during removal and installation of the insulator, thus reducing the thermal insulation provided by the device.

In view of the foregoing it would be desirable to provide a rigid insulating cover which fits over an access opening to an attic or other space and provides a thermal barrier in order to prevent or minimize the loss of heat or cooling air from a room into the attic. It would be further desirable to provide such a cover which is also easy to install, easily moved when necessary, and which is useful for both finished attic floors and unfinished attic floors and which has a low profile.

SUMMARY OF THE INVENTION

With the foregoing background in mind, it is an object of the present invention to provide a rigid thermal insulating cover having a top, a plurality of sides extending from the top and a wide base perimeter extending from the plurality of sides. The device may be formed as a unitary piece, or may be provided in two or more sections which are easily assembled together. A piece of foam, acting as a gasket, may be affixed to the base perimeter.

BRIEF DESCRIPTION OF THE DRAWINGS

The invention will be better understood by reference to the following more detailed description and accompanying drawings in which.

DETAILED DESCRIPTION

Figure 1:
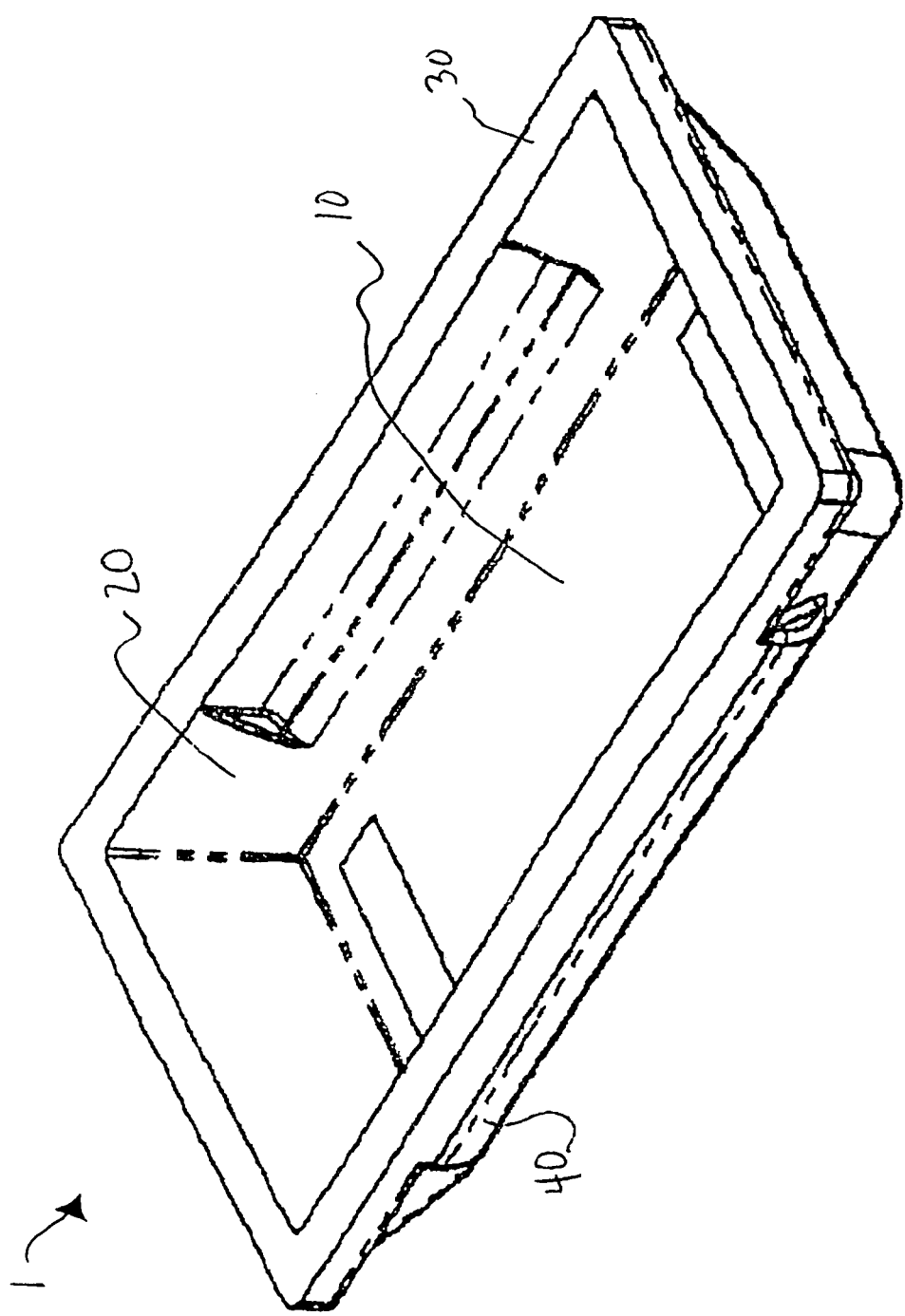
FIG. 1 is an isometric view of the insulting cover of the present invention.
Figure 2:
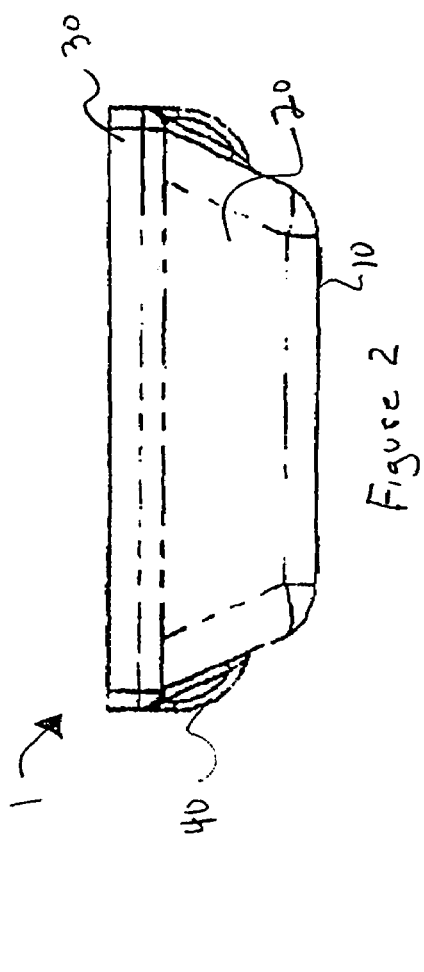
FIG. 2 is an end view of the insulating cover of FIG. 1.
Figure 3:
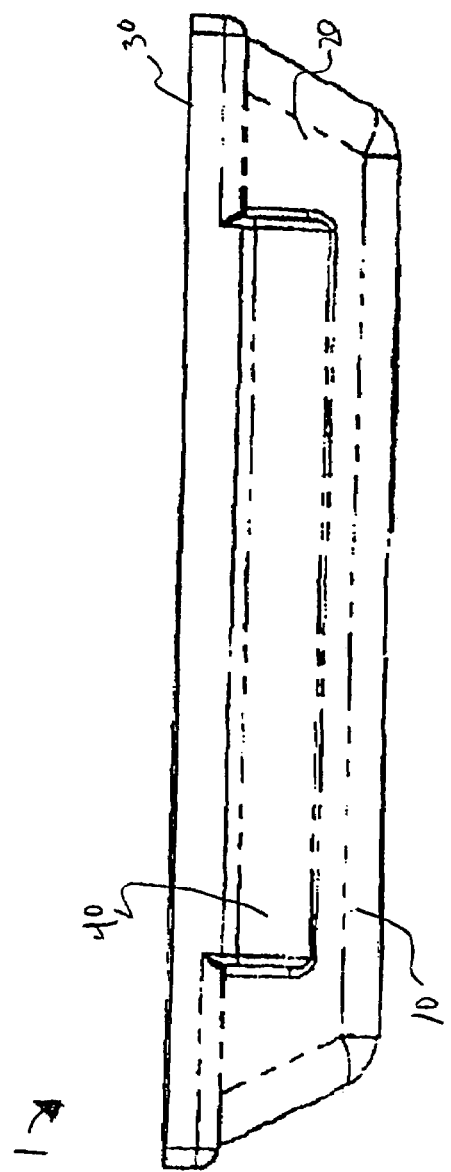
FIG. 3 is a side view of the insulating cover of FIG. 1.

An insulating cover is presented. The cover is comprised of an insulating material such as closed cell foam, and is designed to fit over an opening such that the cover provides an insulating barrier between two areas separated by the opening.

In a preferred embodiment the cover is used to insulate the opening associated in a ceiling which allows access to an attic. Typically a set of folding stairs is provided in the ceiling to allow walk-up access to the attic. A problem associated with this arrangement is the lack of insulation provided between the attic and the room below when the stairs are in their folded position. Typically, this opening is left uninsulated since the folding stairs occupy the space where insulation would normally reside.

The present invention overcomes this problem by providing a rigid cover which overlaps the opening used by the folding stairs and by having a raised portion which fits over the folding stairs when they are in the folded position, such that a continuous thermal barrier is provided between the attic and the space below.

Referring to FIGS. 1-4C in which like elements are provided having like reference designations throughout the several views, the cover 1 features a large flat rectangular base perimeter 30 which allows the cover 1 to rest on the floor of the attic. Having a wide base perimeter 30 enables the cover to work with both finished and unfinished attic areas. Extending from the base are four sloping sidewalls 20 which extend to a flat rectangular top 10. The sloping sidewalls 20 are preferred as they allow for stacking of covers one on top of the other (e.g. for storage in a retail store) as well as providing a certain degree of rigidity. Alternately, generally vertical sidewalls could also be used. While a generally flat top portion 10 is shown in the figures, the top could be curved, domed, or pointed as well.

The cover 1 further includes a protuberance 40 in two of the sidewalls. The protuberances 40 are designed to fit over parts of the folding stairs when the stairs are in the folded position. The protuberances 40 allow the overall height of the cover to be minimized, thus reducing the overall size of the cover. The low profile allows the cover to be disposed over attic openings even when the opening is in an area of the attic where the roof limits the amount of space above the opening.

In a preferred embodiment, the cover is comprised of a unitary piece of material. With such an arrangement there is no assembly required, making the device simple to use and install. The cover is placed over the opening, with no need to mechanically fasten the cover to the attic or around the opening. When access to the attic is desired, the cover can be easily moved from its position over the opening with a minimal amount of effort. The cover also features no moving parts, thus there is no need for maintenance, and nothing to wear out or be replaced.

Figure 4:
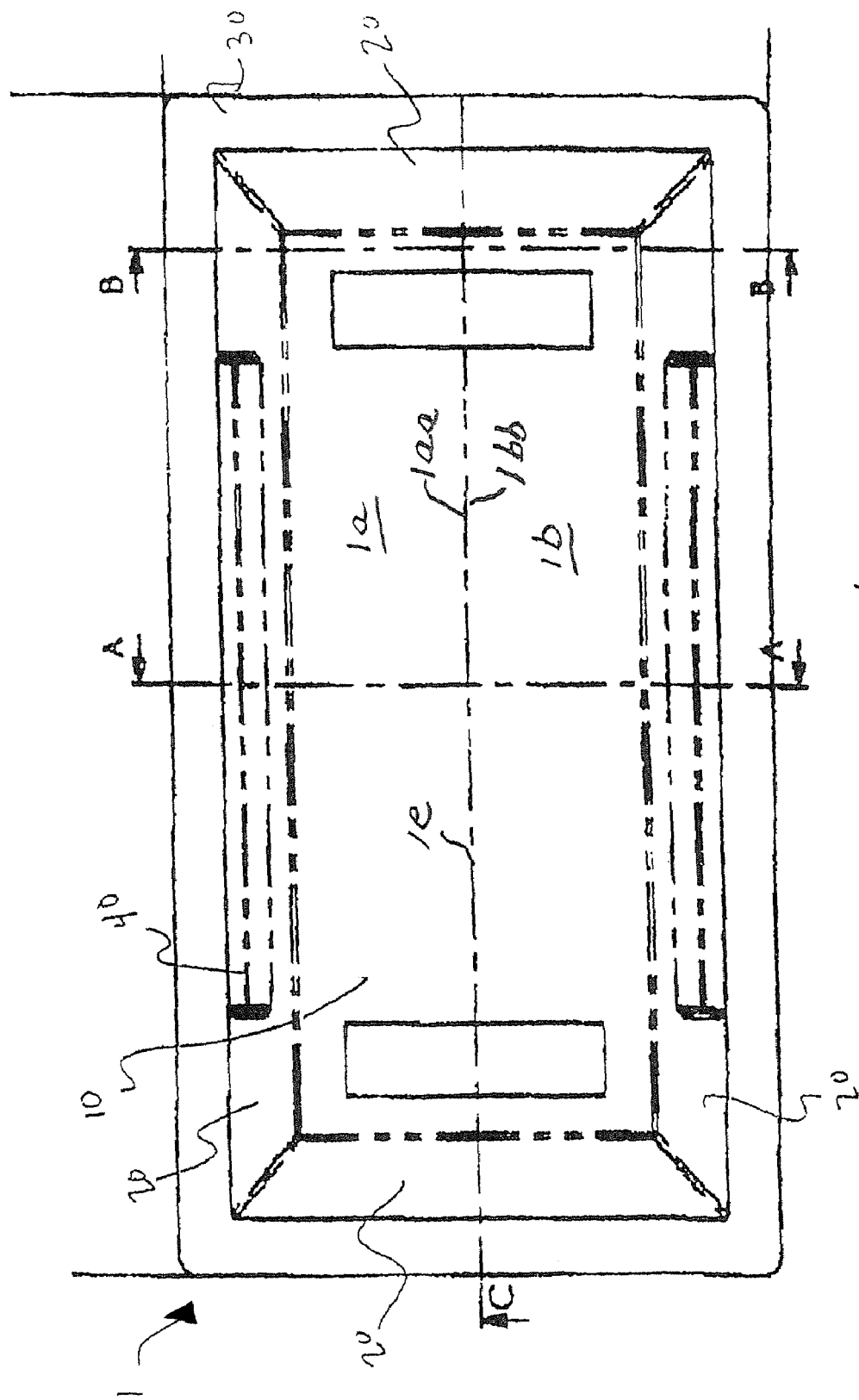
FIG. 4 is a bottom view of the insulating cover of FIG. 1.
Figure 4A:
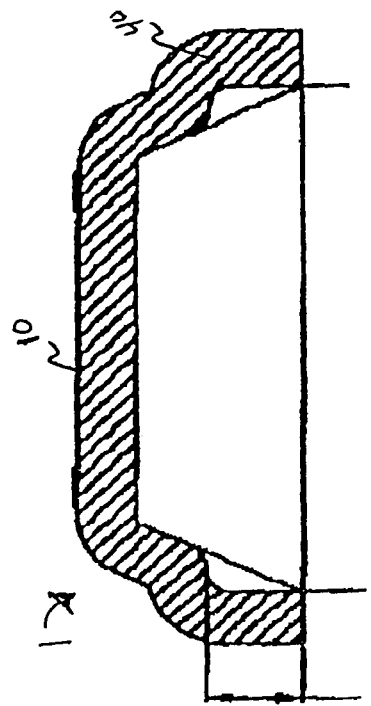
FIG. 4A is a cross-sectional view of the cover of FIG. 4 taken across line AA.
Figure 4B:
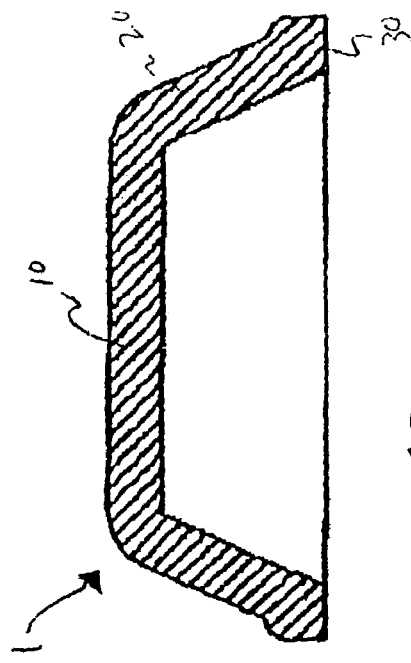
FIG. 4B is a cross-sectional view of the cover of FIG. 4 taken across line BB.
Figure 4C:
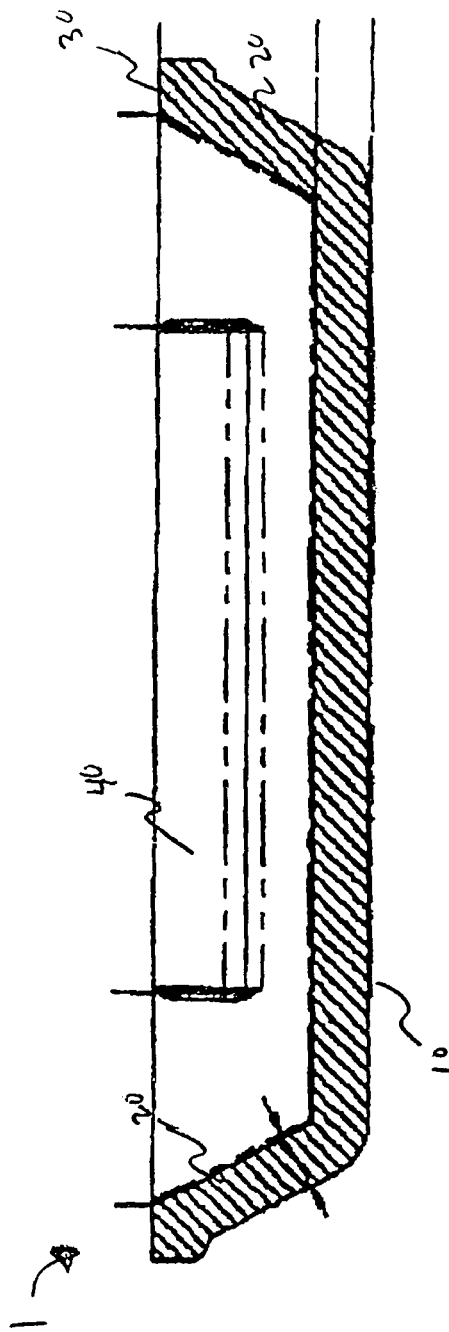
FIG. 4C is a cross-sectional view of the cover of FIG. 4 taken across line CC.

In an alternate embodiment, the cover 1 of FIG. 4 may be provided in two or more pieces. for example pieces 1a, 1b sectioned along axis C, and therefore having flat joining surfaces 1aa, 1bb. The pieces are then joined together to form the resulting cover. The pieces may be joined together mechanically, by an adhesive or tape 1e, or by any means known to those of general skill in the art. One reason for providing the cover in multiple pieces is to make the device easier to ship to customers.

A strip of material may be provided which is attached to the bottom surface of the base perimeter. The material, such as a soft foam material, functions as a gasket between the attic floor and the bottom of the base perimeter. This piece would provide additional thermal protection for any unevenness in the attic floor when the cover is installed.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

What is claimed is:

1. An insulating cover, comprising:
   a top portion; and
   four sidewalls extending from said top portion, wherein said four sidewalls and said top portion have outer surfaces and inner surfaces, wherein the inner surfaces define a cavity having a cavity inner surface, wherein said four sidewalls have respective lengths parallel to the inner surfaces of respective ones of said four sidewalls and parallel to the inner surface of said top portion, wherein the cavity inner surface includes two depressions, wherein the two depressions are disposed in and extend into respective opposing two of said four sidewalls, wherein the two depressions have respective lengths parallel to the respective lengths of the opposing two of said four sidewalls, wherein the lengths of the two depressions are more than half of the lengths of the opposing two of said four sidewalls, said four sidewalls form obtuse angles with said top portion so that the cavity is smaller proximate to said top portion than distal from said top portion, wherein the outer surfaces of the opposing two of said four sidewalls include a respective two protuberances having respective lengths parallel to the respective lengths of the two depressions, wherein the lengths of the two protuberances are at least as great as the lengths of the two depressions, wherein the two protuberances are disposed at positions adjacent to the two depressions and opposite from the two depressions, resulting in a thickness of the opposing two of said four sidewalls being about the same in the vicinity of the two depressions as apart from the two depressions, wherein the insulating cover is configured to cover an attic side of the attic ceiling opening, wherein the two depressions each have a position, a size, and a shape selected to receive a substantial portion a respective side rail of a folding stair associated with an attic ceiling opening, wherein said top portion and said four sidewalls are formed from two or more separable pieces configured to be joined together at a respective two or more joining surfaces to form the insulating cover, wherein the insulating cover further comprises a joining material to join the two or more separable pieces, wherein the joining material is either a glue or a tape.

2. The insulating cover of claim 1, wherein the two depressions are spaced apart from respective corners formed between the opposing two of said four sidewalls and the top portion.

3. The insulating cover of claim 1, further comprising an extended base perimeter extending from said four sidewalls.

4. The insulating cover of claim 3, further comprising a gasket extending along at least a portion of said base perimeter.

5. The insulating cover of claim 1, wherein said top portion and said four side walls are formed from a material comprising a closed cell foam.

6. The insulating cover of claim 5, wherein the closed cell foam consists of a rigid closed cell foam.

7. The insulating cover of claim 1, wherein said top portion and said four sidewalls are formed as a single unitary piece.

8. The insulating cover of claim 1, wherein the two depressions have respective inner surfaces forming a part of the cavity inner surface, wherein the inner surfaces of the two depressions are substantially on one side of respective planes, wherein the planes lie on inner surfaces of the opposing two of said four sidewalls, and wherein the one side of the plane is in a direction away from a center of the cavity.

9. The insulating cover of claim 1, wherein the lengths and widths of the two depressions are less than lengths and widths of the opposing two of said four sidewalls in which the two depressions are disposed.

10. The insulating cover of claim 1, wherein largest surfaces of the two depressions forms acute angles with inner surfaces of the opposing two of said four sidewalls.

11. The insulating cover of claim 1, wherein the joining surfaces are flat.

* * * * *